(No Model.)

3 Sheets—Sheet 1.

J. P. TOLMAN.
CORDAGE, &c.

No. 304,045.

Patented Aug. 26, 1884.

WITNESSES
W. J. Cambridge
Chas. E. Griffin

INVENTOR
James P. Tolman
per H. E. Teschemacher
his Att'y (No Model.)　　　　　　J. P. TOLMAN.　　　3 Sheets—Sheet 2.
CORDAGE, &c.
No. 304,045.　　　　　　　　Patented Aug. 26, 1884.
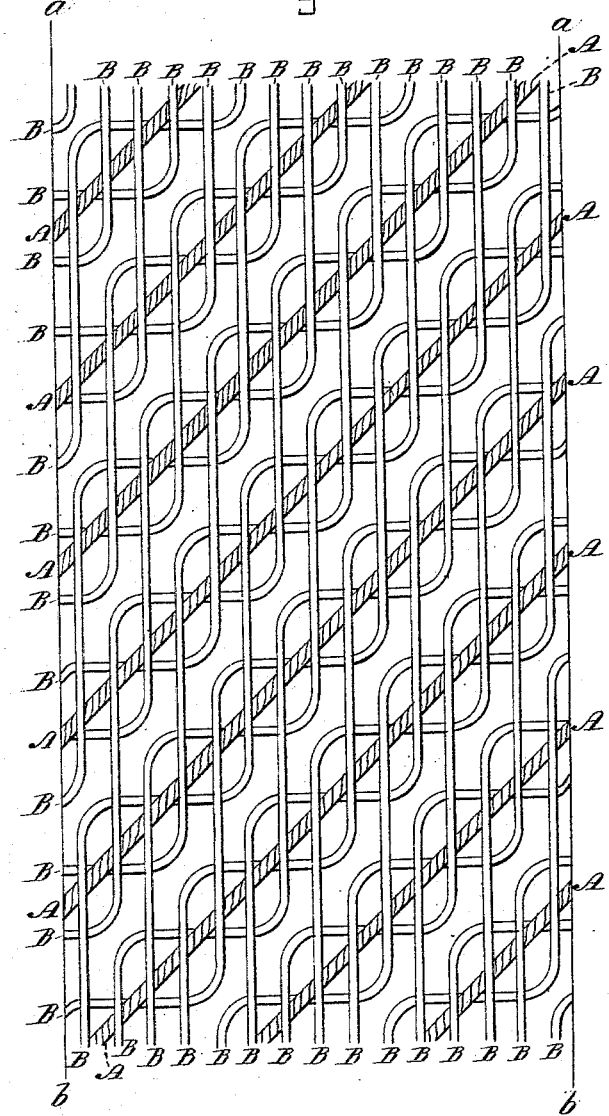
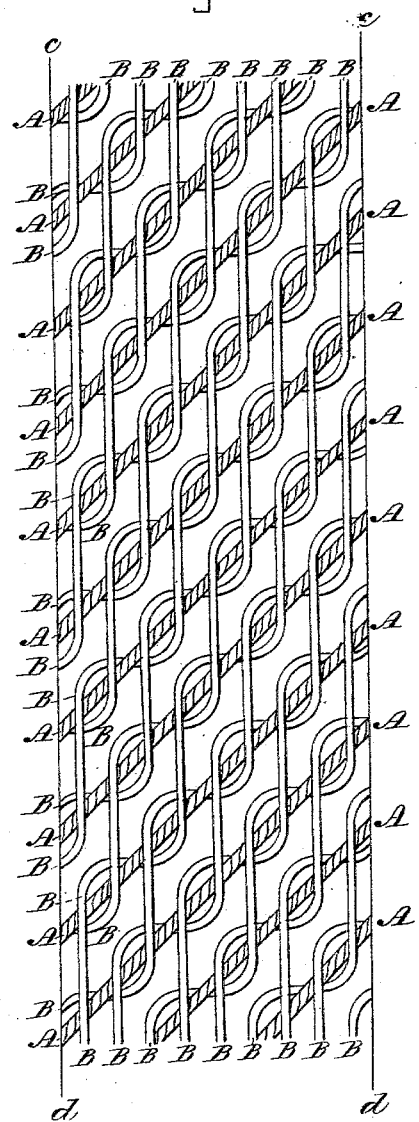
WITNESSES　　　　　　　　　　INVENTOR (No Model.)

J. P. TOLMAN.
CORDAGE, &c.

No. 304,045. Patented Aug. 26, 1884.

WITNESSES
W. J. Cambridge
Chas. E. Griffen

INVENTOR
James P. Tolman
per H. E. Teschemacher
Atty

UNITED STATES PATENT OFFICE.

JAMES P. TOLMAN, OF WEST NEWTON, MASSACHUSETTS.

CORDAGE, &c.

SPECIFICATION forming part of Letters Patent No. 304,045, dated August 26, 1884.

Application filed June 26, 1883. (No model.)

*To all whom it may concern:*

Be it known that I, JAMES P. TOLMAN, a citizen of the United States, residing at West Newton, in the county of Middlesex and State of Massachusetts, have invented certain new and useful Improvements in Cordage, &c., of which the following is a full, clear, and exact description, reference being had to the accompanying drawings, making part of this specification, in which—

Figure 1:
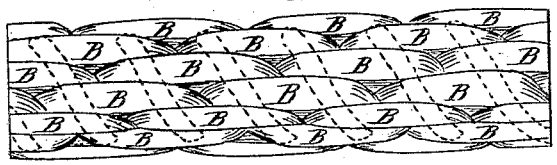
Figure 2:
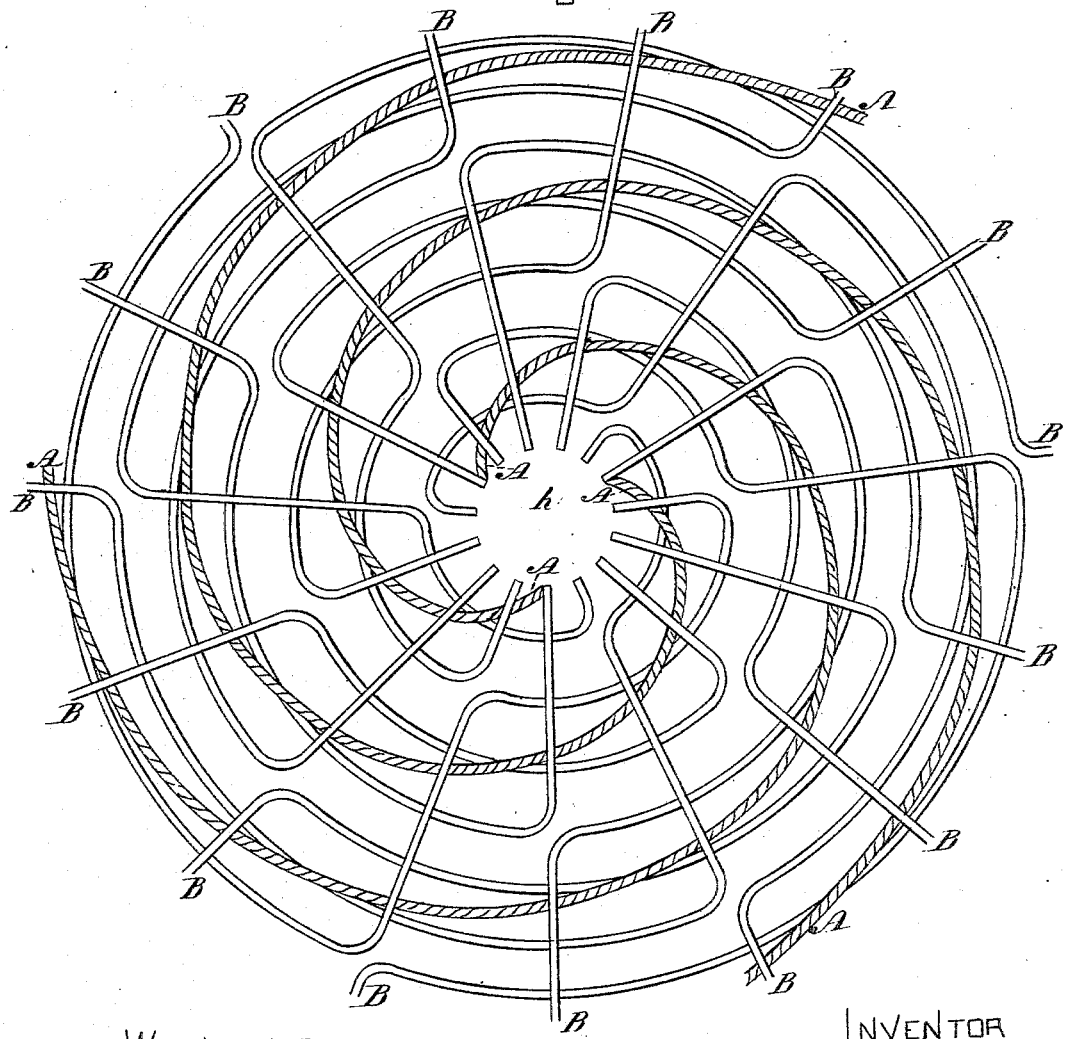
Figure 5:
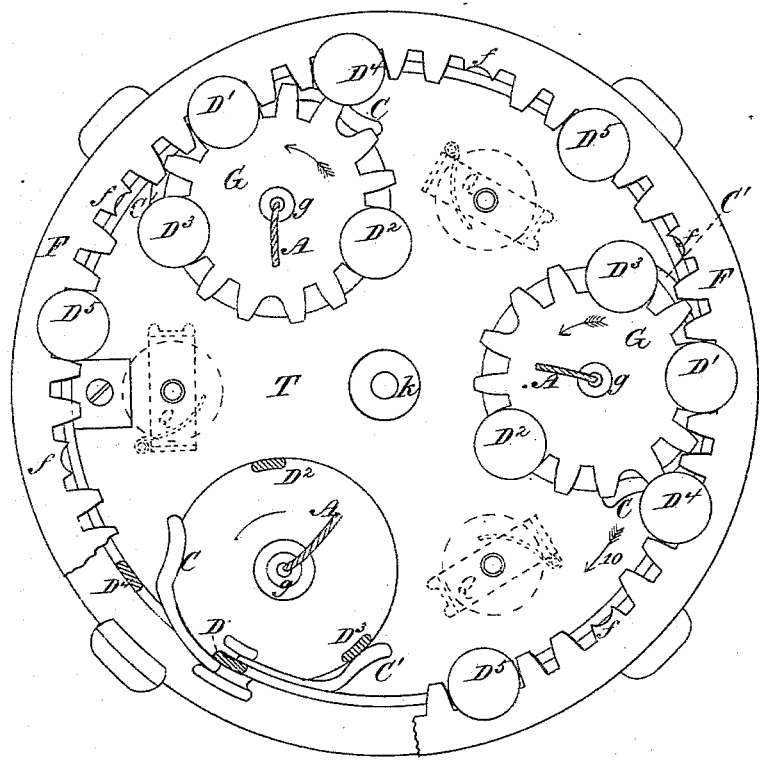
Figure 6:
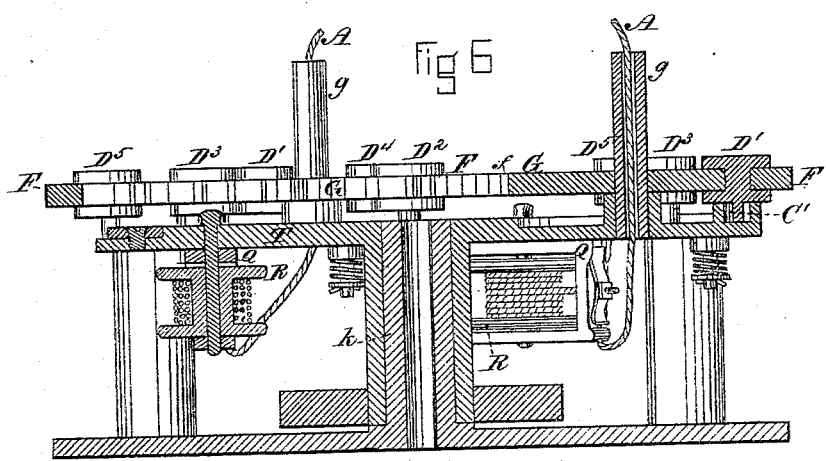

Figure 1 is an elevation of a piece of cord made in accordance with my invention. Fig. 2 represents the arrangement of strands in my new cord, consisting in this case of fifteen main strands and three inside or extra strands, with all the parts widely separated for convenience in description, the cord being developed into a cone, which is projected upon the paper. Fig. 3 represents the arrangement of the strands in the same cord, as shown in Fig. 2, with the parts separated as before, and the cord slit longitudinally on the line $a\,b$, and then opened out into a flat mesh and projected upon the paper, each end of a strand, where cut by the line $a\,b$ on the right-hand side of the drawings being a continuation of the same strand where cut by the line $a\,b$ on the left-hand side of the drawings. Fig. 4 represents the arrangement of the strands in my new cord when the same shall consist of only nine main strands and three inside or extra strands, with the parts separated as before, and the cord slit longitudinally on the line $c\,d$, and opened out into a flat mesh and projected, as in Fig. 3, each end of a strand, where cut by the line $c\,d$ on the right-hand side of the drawings, being a continuation of the same strand where cut by the line $c\,d$ on the left-hand side of the drawings. Fig. 5 is a plan of my improved machine for making the cord as shown in Figs. 1, 2, and 3, with a portion of the toothed guide-ring and one of the carrier-gears removed, the travelers in their various positions being indicated by disks and sections of their feet, and the positions of the spool-frames for carrying the inside strands being indicated by dotted lines. Fig. 6 is a vertical section through the center of the same.

The object of my invention is to accomplish the union of two different series of strands in a single cord in such a manner that one set or series, which I call the "inside or extra strands," shall form a spiral by twisting around a common center in the ordinary manner of twisted cord and the other or second set or series of strands, called herein "main strands," shall be united by an interlocking twist, by which they bind each other together, and by which they also bind the inside strands to themselves and to each other by also interlocking therewith, the main strands only appearing upon the face of the cord.

The advantages of an interlocking twist in the formation of a cord are fully set forth in the United States Patent No. 20,691, granted to James A. Bazin, June 29, 1858. There are objections, however, to cords made in this form, because the component strands are bent so sharply about each other that the strain imposed upon the cord in its use is transferred throughout each strand in a succession of sharp curves in the direction of its length, and thus is created a tendency to rupture on the outside of each of these curves. Therefore, while the binding of the strands together by the interlocking process very much improves the wearing qualities of the cord under a moderate strain, it does not increase but rather diminishes its tensile strength. By my new arrangement of strands, however, the main strands, in crossing each other, wind also around the the inside strands. The sharpness of the curves is in this way very much modified, and the tendency to rupture on the outside of the curves thereby diminished. Moreover, in making my new cord, the number of the component strands is greater than in the cord made in accordance with the Bazin patent, before mentioned, by the number of inside strands which I introduce, these inside strands being preferably larger than the main strands, and consequently the size or diameter of the main strands is necessarily less in a cord of a given size than if they were to be joined together by an interlocking twist in the ordinary manner without the introduction of the inside strands. The diminishing of the size of the main strands has a twofold advantage: First, the loops appearing upon the face of the cord are much finer, giving it a handsome appearance and smoother surface with less danger of abrasion in use; second, very much more length of strand can be wound upon the same spool in the machine used for making this cord, and consequently it requires less time and attention of the operative in charge of the machine to keep the spools replaced as they run out, thereby enabling the cord to be more cheaply produced; but the principal advantage of my new form of manufacture is when it is desired to unite two different materials into a single cord for the purpose of adding strength or diminishing cost—as, for instance, the inside strands of my cord may be made of Manila hemp, linen, rawhide, or wire, while the main strands can be made of cotton or some other soft fiber capable of taking a good finish, whereby the cord manufactured—window-sash cord, for example—may present as fine an appearance and smooth a surface as a cord made entirely of cotton, while at the same time it will possess much greater strength by reason of the inside strands being of stronger material; or the inside strands may be made of tow, cotton, jute, or other inexpensive fiber, while the main strands, which alone show upon the face, may be of worsted, silk, or other costly substance, thus producing the effect of a solid cord of the more costly material, and greatly facilitating the cheapening of cords made for ornamental purposes.

It has been customary, when it was desired to unite two different materials into a single cord, to prepare the strands by winding the outer or finishing material around a core or heart of the cheaper substance, and then to unite the strands thus prepared by twisting them together. A large core of cheap material has also been covered by braiding fine strands of the finishing material about it. When manufactured by the first of these methods, the twist had a tendency to open and the strands to separate, which could only be overcome by twisting the cord too hard for most ornamental purposes or trimmings; and when made by the second method the braided cover slipped upon the surface of the core, or its fine strands were broken by abrasion, making a very undesirable cord for any purpose where it was to be subjected to rough usage. In my new form of cord, however, the inside or extra strands are as effectually concealed as by the above-named methods of manufacture, and the whole fabric is firmly bound together at every point. I am thus enabled to produce a cord which, while soft and pliable enough for ornamental and decorative purposes, shall be so firmly bound together that its parts do not become separated by handling, and at the same time it may be made of two different materials, only one of them showing upon the surface; and I can also make firm and durable cords for such purposes as signal-cords for railroad-cars and tail-cord for horse-blankets, where colored designs must be produced, at trifling expense, but where the cord with braided cover in general use is quickly destroyed by the abrasion of its surface and exposure of the core.

In the said drawings, A denotes the inside or extra strands, which are wound in a spiral around the center $h$ of the cord in the manner of the ordinary strands of a twisted or laid cord.

B denotes the main strands, which are bound to each other and to the inside strands by an interlocking twist produced in a manner to be presently decribed. In Figs. 2 and 3 there are fifteen of these main strands B and three of the inside strands A, and in Fig. 4 there are only nine main strands B, while there are three inside strands A, as in Figs. 2 and 3.

In Figs. 2 and 3 it will be seen that each of the main strands B appears upon the surface of the cord in a direction parallel to its length and passes in front of four other of such main strands B and two of the inside strands A. It then passes away from the surface, going behind one of the inside strands A and four of the main strands B, when it again comes to the surface; and this arrangement is repeated throughout the entire cord, and each of the inside strands A has four of the main strands B passing in front of it for each two of such main strands passing behind it. The inside strands are thus concealed from view on the face of the cord, and they and the main strands are firmly bound together.

In Fig. 4, where three inside strands A and nine main strands B are used, it will be seen that each of the main strands B passes in front of two of the inside strands A and two other main strands B, and then passes behind one inside strand A and two main strands, B, and each of the inside strands A passes behind two of the main strands B for each one of such main strands passing behind it. The inside strands and the main strands are thus firmly united together, and the main strands only appear upon the surface of the cord.

For the purpose of making my invention clear and enabling others skilled in the art to understand it, I will now proceed to explain the manner in which I accomplish the union of the two series of strands in a single cord, as described.

Figs. 5 and 6 represent a machine for making cordage, in which the travelers $D'$ $D^2$ $D^3$ $D^4$ $D^5$ are operated by the stationary guide-ring F, the revolving-table T, the carrier-gears G, and the switch-levers C C', in such a manner that the threads or strands carried by their spool-frames (not shown) shall form an interlocking twist, as fully described in Letters Patent of the United States, granted to me April 24, 1883, No. 276,201. To the under side of the main table T of the machine are secured spool-frames Q, which carry spools R, upon which are wound the inside or extra strands A of my improved cord. These strands are led through the studs $g$, which for the purpose are lengthened out and made tubular, and upon these studs revolve the carrier-gears G.

It will be seen, by reference to Fig. 5, that when the table T is revolved in the direction of the arrow 10 any traveler, as $D'$, carrying one of the main strands, when brought by a carrier-gear, G, to the outer periphery of the table and left in a cut-away tooth or socket, f, of the guide-ring F, allows four other of the travelers, D² D³ D⁴ D⁵, carrying main strands, and two of the studs g carrying inside or extra strands A to pass between it and the center of the machine before it again passes with its main strand towards the center of the platform T; and any traveler, as D³, when taken from its place in the guide-ring, and carried forward to a new position by the carrier-gear passes with its main strand behind or inside of four other of the travelers, D' D¹ D² D⁵, and their respective main strands, and also behind one stud g carrying an inside or extra strand A, before again coming to the outer periphery of the table and bringing its strand to the outer surface of the cord; and any stud g carrying an inside strand A will pass between the center of the machine and four of the travelers, as D' D¹ D² D⁵, during the time that two of the travelers, as D³ D⁴, pass between it and the center of the platform T. The main strands and the inside strands will thus be united together into a single cord, as already described.

I do not confine myself to the employment of the numbers of inside and main strands shown and described, as any number of inside strands that may be found desirable may be employed, and also any number of main strands that may be conveniently associated with the number of inside strands adopted. Such changes in the number of inside strands would be effected by changing the number of carrier-gears, one of such inside strands accompanying each carrier-gear; and the number of travelers carrying main strands may be varied relatively to the number of carrier-gears, as explained in the specification of my Letters Patent already referred to, No. 276,201. The inside strands are represented in Figs. 2, 3, and 4, and by dotted lines in Fig. 1, as passing around the central line of the cord in a spiral of forty-five degrees. It is not necessary that this angle should be used, as these strands may be given a greater or less turn.

The process of manufacture may be varied, if desired, in such a manner that the main strands B shall appear upon the surface of the cord in a direction nearly at right angles to the length of the cord instead of parallel to it, as shown in the drawings; and in such case the direction of these main strands B, when concealed within the body of the cord, would be in a direction nearly parallel to its length. The effect of which I speak may be observed by an inspection of Figs. 3 or 4, when turned at a right angle, so as to bring the lines a b and c d into horizontal planes. Such an effect would be produced by revolving the guide-ring F in the same direction with the table T, but at a speed twice as great.

In this application I make no claim to the construction of the machine herein shown for producing my new cord or twine, as this forms the subject of a separate application for Letters Patent filed March 21, 1884, Serial No. 125,072.

What I claim as my invention, and desire to secure by Letters Patent, is—

1. As a new article of manufacture, a cord or line composed of two different series of strands, the strands A of one series being wound spirally around the center or axis of the cord, and lying parallel to each other, and each and every strand B of the other series being looped around the strands A, binding each one in succession to the next, and in its passage around a strand A passing also around and interlocking a given number of strands B of its own series, thus binding the two series of strands together, substantially in the manner and for the purpose set forth.

2. The combination, in a cord or line, of two series of strands, A B, arranged in relation to each other, as described, whereby each strand B passes in front of a given number of strands B of its own series, and a given number A of the other series, and then passes behind the same number of strands B of its own series that it previously passed in front of, and a different number of strands A of the other series from that which it previously passed in front of, whereby the two series of strands are entwined and interlocked, substantially as and for the purpose described.

3. A cord or line composed of two series of strands, A B, in which each of the strands B passes around and interlocks with a given number of other strands B of its own series, and binds each strand A of the other series to the next succeeding strand A by winding around each of them in turn, and in such winding passes twice in front of and only once behind each of the strands A, whereby the strands B are caused to conceal the strands A from view upon the outer face of the cord and unite the two series of strands together, substantially in the manner and for the purpose set forth.

4. A cord or line consisting of strands B, held together by an interlocking twist, in combination with a series of extra strands, A, lying within the centers of the supplementary circles around which the strands B are revolved while being interlocked with each other, substantially as set forth.

Witness my hand this 22d day of June, A. D. 1883.

JAMES P. TOLMAN.

In presence of—
P. E. TESCHEMACHER,
W. J. CAMBRIDGE.